United States Patent [19]

Tyrner

[11] 4,383,213

[45] May 10, 1983

[54] TRIODYNE

[76] Inventor: Joseph M. Tyrner, 20 Tingley, Morristown, N.J. 07960

[21] Appl. No.: 288,256

[22] Filed: Jul. 27, 1981

Related U.S. Application Data

[63] Continuation-in-part of Ser. No. 221,422, Dec. 30, 1980, abandoned.

[51] Int. Cl.³ .......................... H02P 9/10; H02P 9/14; H02P 7/16; H02P 3/14
[52] U.S. Cl. ................................ 322/53; 310/102 R; 318/158; 318/376; 322/63
[58] Field of Search .......................... 310/40 R, 102 R; 322/53 R, 91, 63–66; 318/376, 344, 158; 320/61

[56] References Cited

U.S. PATENT DOCUMENTS 2,388,023 10/1945 Tyrner .............................. 310/40 R
2,528,478 10/1950 Tyrner ................................. 322/91
2,592,522 4/1952 Hendrick et al. ...................... 322/53

FOREIGN PATENT DOCUMENTS 5926 of 1913 United Kingdom .

*Primary Examiner*—R. J. Hickey

*Attorney, Agent, or Firm*—Hopgood, Calimafde, Kalil, Blaustein & Judlowe

[57] ABSTRACT

A dynamoelectric machine having a multiple of three poles and a corresponding multiple of three brushes is disclosed. Each of the poles are wound poles, two of each group of three poles being excited with a constant excitation during normal operation, the third of each group of poles being a control pole, excited so as to produce a flux that both varies in magnitude and reverses in polarity. With an input voltage connected to first and second brushes of each group of three, an output voltage may be derived from first and third brushes in a magnitude determined by the polarity and intensity of the field of the control pole. The machine is also adapted to provide mechanical output power from its rotating shaft, and also to accept input power from its rotating shaft. The output voltage obtainable may be varied between zero and the value of the input voltage, and also increased above the input voltage, and decreased below zero, reversing polarity. Means are also disclosed for providing regenerative braking of a motor driven by the output voltage of the machine and returning power to a battery power supply without increasing shaft speed of the machine, by augmenting the flux of a pole to increase the input voltage while maintaining the output voltage constant.

13 Claims, 11 Drawing Figures

TRIODYNE

The instant application is a continuation-in-part of application Ser. No. 221,422 filed Dec. 30, 1980, now abandoned.

This application is related to the field of dynamoelectric machines. In particular, this application is related to direct current dynamoelectric machines usable as voltage controllers.

BACKGROUND OF THE INVENTION

This application relates to various improvements to an unsymmetrical dynamoelectric machine having an integral multiple of three poles and an integral multiple of three brushes, performing the general function of a motor-generator set in a single integral device, and having capability of accepting or providing power from its rotating shaft. Such a device, known as a Triodyne, is disclosed in U.S. Pat. No. 2,388,023, issued to me on Oct. 30, 1945, and in U.S. Pat. No. Re. 22,907, reissued Aug. 12, 1947, herein incorporated by reference. U.S. Pat. No. Re. 22,907 sets forth the basic theoretical considerations for the design and construction of such a machine.

A device in accordance with the claims of said patents has been constructed, and performed satisfactorily as a voltage controller for electrical welding, with the rotating shaft supporting the load of a ventilating fan. In this application, the device was satisfactory, and provided the low voltage, high current supply needed for welding from a high voltage, low current source. However, in an attempt to use this device as a voltage controller for an electric vehicle, it was found by further analysis and testing that the use of a device according to my previous patents had serious drawbacks. Placing the winding for the main or motor field on a single pole required a large winding, to overcome the reluctance of two air gaps. This large winding in turn requires a large, long pole piece, and a large frame diameter for the device. This would also result in a cooling problem, since the device would approximately double in volume with a less than sixty percent increase in surface area. It was also found that such a dynamoelectric machine would increase in speed upon an attempt to return power from the load, such as for regenerative braking, an undesirable effect in some applications.

Also, with a control pole being fully excited to provide minimum output voltage, and turned off to provide maximum output voltage, the maximum output voltage was further limited by residual magnetism in the control pole, since the resultant residual flux caused something less than full desired output, of an unpredictable and unstable value.

The instant invention overcomes these and other deficiencies of the prior art.

SUMMARY OF THE INVENTION

The invention is a dynamoelectric machine having an integral multiple, i.e., one or more sets, of three poles, and an armature which rotates in a fixed frame carrying the poles. On the commutator of the armature are an integral multiple of three brushes, located equidistantly from each other.

In a three pole dynamoelectric machine according to the invention, an electrical power supply such as a battery, is connected to first and second brushes. First and third brushes deliver controlled voltage to a load, such as a traction motor of an electric vehicle. Current may flow into the load to drive it. This current direction is referred to as forward current. If current is returned to the subject machine, it shall be called reverse current.

Two of the three field coils are permanently fully excited shunt fields, while the third is a control coil. Its excitation may be varied from full excitation in one polarity to full excitation in the other polarity. Full excitation, for purposes of this application, is defined as excitation producing equal magnetic strength on three poles of a three pole machine according to the invention, one pole having a fixed north polarity, one pole having a fixed south polarity, and one pole being continuously variable from north to south polarity, by excitation which varies continuously from full excitation with current flowing in its winding in a first direction, through zero excitation and to full excitation with current flowing in the winding in the opposite direction. The shunt winding on one pole may also be wound with a conductor having the same number of turns as other poles, but with a larger size conductor, and provided with means for limiting the current through the winding to provide the same number of ampere turns in this coil as in other coils on other poles, and further provided with means for bypassing the limiting means to provide greater excitation for this pole, for returning energy to a power supply from a load, such as for regenerative braking, without increasing the rotational speed of a machine according to the invention.

It should be noted that a dynamoelectric machine according to the invention may be built with three, six or nine poles, and a corresponding number of brushes, or in any other integral multiple of three poles and brushes. In such an instance, poles and brushes may be symmetrically disposed and connected in parallel. Thus, for instance, in a nine pole machine, two sets of three field coils each are permanently fully excited shunt fields, and the remaining set of three coils are control coils, whose excitation may be varied from full excitation in one polarity to full excitation in the opposite polarity.

Thus, it is an object of the invention to provide a dynamoelectric machine with a frame having an integral multiple of three field poles equally spaced about the interior of the frame, each said pole having a winding thereon, an armature rotating within said frame, and integral multiple of two of the field poles being excited with a fixed polarity when the dynamoelectric machine is in operation. It is a feature of the operation that half of these poles are north poles and half are south poles. It is an advantage of the invention that providing the main or motor field may be done with an exciting coil less than half the size of that required by a device in accordance with my prior patent, resulting in a reduced physical size and increased cooling surface for the field coils and for the dynamoelectric machine itself.

It is a further object of the invention to produce such a dynamoelectric machine having a control pole which may be excited to the strength and polarity of a north pole, and to the strength and polarity of a south pole, and all points of lesser strength in between. It is a feature of the invention that a variable control pole is produced by a winding through which is applied a reversible and continuously adjustable voltage source. It is an advantage of the invention that such a dynamoelectric machine can produce an output voltage whose value is unaffected by residual magnetism of a field pole and the unpredictable and unstable resulting flux.

It is a further object of the invention to provide such a dynamoelectric machine having means for temporarily increasing the excitation of a normally-fixed pole to produce a higher voltage on the supply side of the machine when energy is returned from a load on the output side of the machine, such as during dynamic or regenerative braking. It is a feature of the invention that a stepwise change in excitation is produced by winding the pole with a larger wire, and interposing current limiting means to adjust its strength, and temporarily bypassing the current limiting means to increase the strength of the pole. It is an advantage of the invention that where the power supply is a battery, the recharging efficiency of the battery is increased, without substantially increasing the shaft speed of the dynamoelectric machine.

Other objects, features and advantages of the invention will become apparent below.

BRIEF DESCRIPTION OF THE DRAWINGS

In the drawings forming a part hereof, like reference characters indicate corresponding parts in all views.

DETAILED DESCRIPTION OF THE INVENTION

Figure 1:
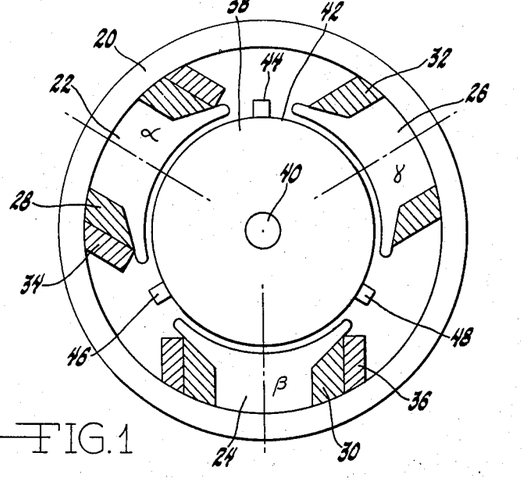
FIG. 1 is a diagrammatic view showing a frame having three poles, on which are field coils and stabilizing coils, and showing the armature with the brushes spaced apart at an angular spacing of 120 mechanical degrees around the center of the armature.

FIG. 1 shows a three pole embodiment of a dynamoelectric machine according to the invention having a frame 20 made of a magnetic circuit material for providing a magnetic flux path and provided with inwardly extending poles 22, 24, and 26, identified by poles alpha (α), beta (β) and gamma (γ). Alpha and beta poles 22 and 24 serve as motor poles in the preferred embodiment, and gamma or control pole 26 together with beta pole 24 serve as generator poles, under normal operation. However, a dynamoelectric machine according to the invention proportions two electrical powers and a mechanical power so that their signed algebraic summation is zero. Therefore, the motor poles may act as generator poles, and the generator poles may act as motor poles, or all poles may act as generator poles if mechanical energy is supplied to the machine. Poles 22, 24 and 26 are provided with windings, pole 22 carrying an alpha winding 28, pole 24 carrying a beta winding 30, and pole 26 carrying a gamma winding 32. Alpha and beta poles 22 and 24 are shown provided with stabilization windings 34 and 36, respectively. Rotatively disposed within frame 20 is an armature 38, carried by shaft 40, and provided with a number of armature slots which is an integral multiple of three. In an actual embodiment of the invention, armature 38 has forty-five slots, as will be apparent from FIGS. 3, 4, and 5. Armature slots are identified with numerals 1' to 45', as are commutator segments 1' to 45' to distinguish them from other reference numerals. Armature 38 has a commutator surface 42, and three brushes, equally disposed about commutator surface 42 at intervals of 120 mechanical degrees, as will be apparent. For a dynamoelectric machine according to the invention having a greater number of poles and brushes, the spacing is 120 electrical degrees. To aid in understanding and description, these three brushes will be defined as an A brush 44, a B brush 46 and a C brush 48.

A computer model indicates that under certain conditions such as arrangement of field polarity, direction of rotation, saturation of iron in the armature, the main field can be cancelled out by a component of the armature field, causing the machine to become unstable. Thus, to prevent a runaway, stabilizer coils should be placed on one or two poles. The computer model indicates that stabilization may be obtained by using the stabilization coil arrangement given by the following matrix:

| Poles | Brush Current to Be Used For Excitation | | |
|---|---|---|---|
| | Column 1 | Column 2 | Column 3 |
| 22 (alpha) | none | −Ic | Ib |
| 24 (beta) | Ic | none | −Ia |
| 26 (gamma) | −Ib | Ia | none |

It is believed that selecting series windings to be used, and the current and polarity to be used to excite the winding from the matrix above is sufficient to achieve stabilization of the machine at least in the absence of saturation and armature reaction effects. For best results, minor adjustment in excitation may be necessary. For this purpose, shunt resistors may be added in parallel with stabilizer coils.

Also, based on laboratory test results, it is believed that a useable amount of stabilization may be produced with a single stabilizing winding applied to beta pole 24, preferably responsive to current in C brush 48, as shown in Column 1 above.

As will be apparent, there may be numerous other arrangements of series or parallel stabilizing coils that may be found useful in further improving electrical and mechanical stability of a machine according to the invention, which may be advantageously used in connection with the invention.

Figure 2:
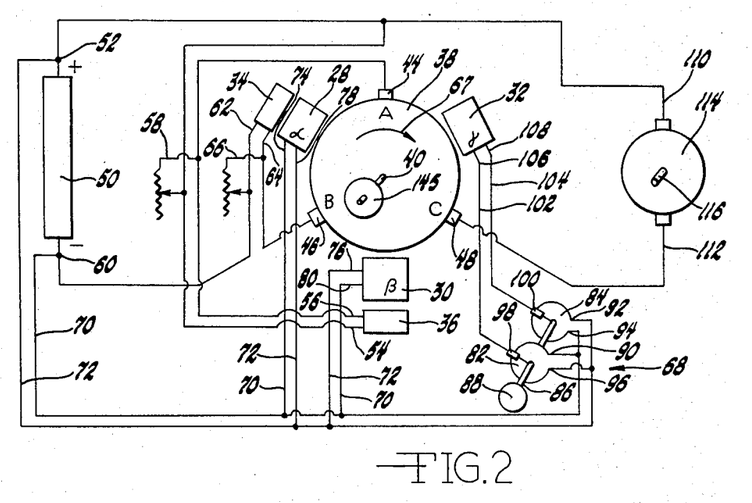
FIG. 2 shows the circuit of the machine, with a power supply and a load motor, field coils and stabilizing coils, and control of the excitation of the control pole by a pair of potentiometers on a common shaft, so that their brushes move together.
Figure 9:
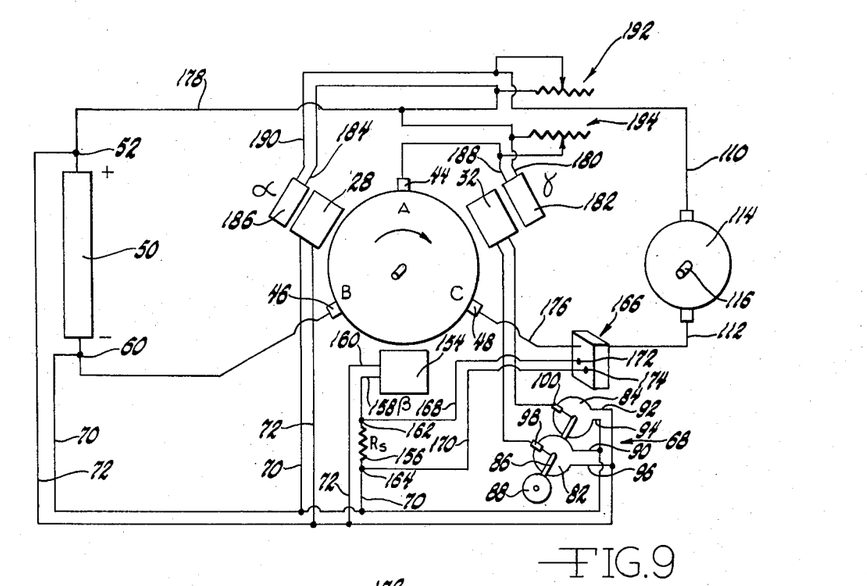
FIG. 9 illustrates a circuit for regenerative braking.
Figure 11:
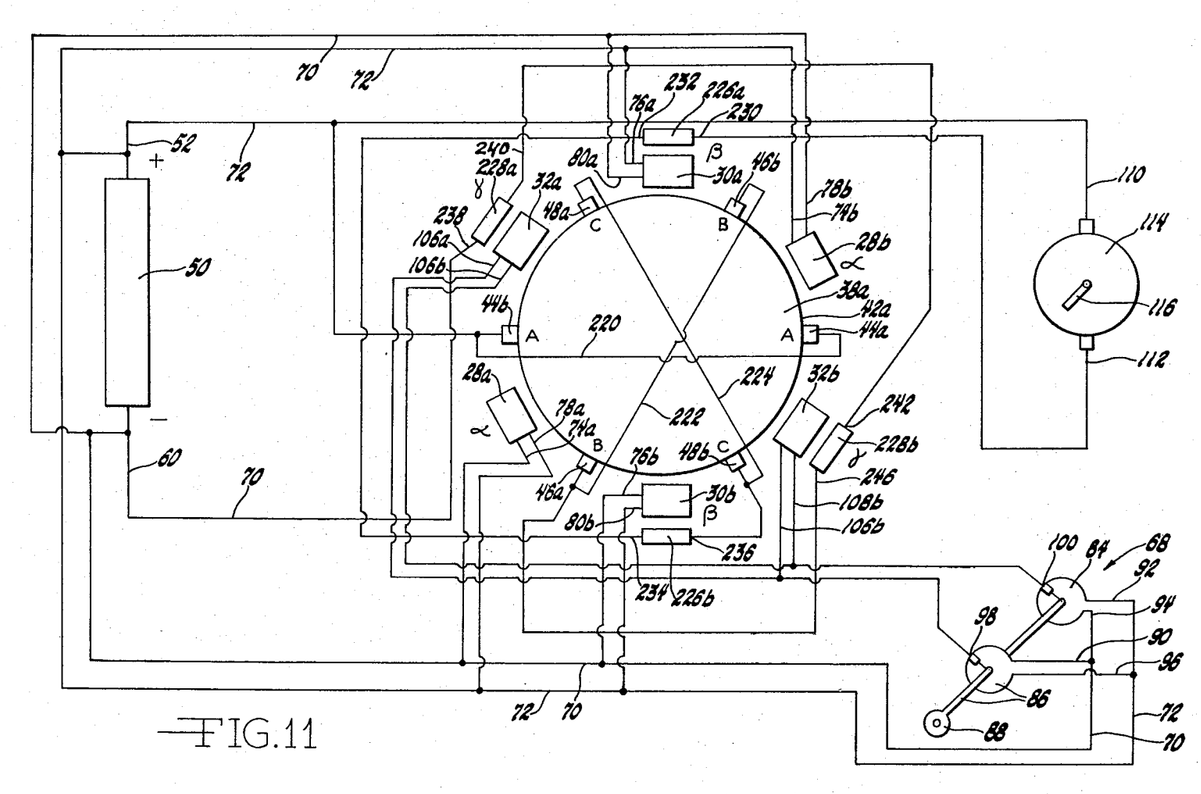
FIG. 11 illustrates a six pole dynamoelectric machine according to the invention.

Stabilization means selected from the matrix above appear in FIGS. 2, 9, and 11, FIG. 2 utilizing stabilization means from column 3, FIG. 9 utilizing stabilization means from column 2, and FIG. 11 utilizing stabilization means selected from column 1.

Referring to FIG. 2, a circuit utilizing a dynamoelectric machine according to the invention is shown. For clarity, the metallic portions of poles 22, 24, and 26, and the magnetic path formed by frame 20 have been omitted. As shown, a power supply shown as battery 50 is connected between A brush 44 and B brush 46. Positive terminal 52 of battery 50 is connected to a first terminal 54 of stabilization winding 36, having a second terminal 56 connected to A brush 44. A shunt resistor 58 is connected between positive terminal 52 and terminal 56, to provide means for making minor adjustments to the current flowing through stabilization winding 36 to achieve optimum stabilization. The negative terminal 60 of battery 50 is connected to a B brush 46 through stabilization winding 34, negative terminal 60 being connected to a first terminal 62 of winding 34, terminal 64 of winding 34 being connected to B brush 46. A shunt resistor 66 is connected between first terminal 62 and second terminal 64, to provide means for making the minor adjustment to stabilization currents flowing through winding 34 to achieve optimum stabilization. Thus, brushes A and B serve as motor brushes, causing the dynamoelectric machine to rotate in direction 67, and the input voltage ($E_{A-B}$), in the absence of regeneration, is the input voltage. As will be apparent, a dynamoelectric machine according to the invention is direction sensitive, since reversing the rotational direction causes both a mirror-image reversal between input and output sides, and also causes the control sense of gamma winding 32 to be inverted.

Power supply or battery 50 also supplies fixed excitation to alpha winding 28 and beta winding 30, as well as variable control excitation to gamma winding 32, through potentiometer assembly 68. As illustrated, wire 72 is connected to positive terminal 52, and wire 70 is connected to negative terminal 60. Wire 70 is connected to first terminal 74 of alpha coil 28 to first terminal 80 of beta winding 30. Wire 72 is connected to second terminal 78 of alpha winding 28 and second terminal 76 of beta winding 30.

Potentiometer assembly 68 includes potentiometers 82 and 84, having a common shaft 86 connected to operating mechanism 88. Operating mechanism 88 may take the form of a control knob in a stationary use of a dynamoelectric machine according to the invention, or may be in the form of an accelerator pedal and linkage in a mobile application. Potentiometers 82 and 84 have first terminals 90 and 94, respectively, connected to wire 70, and second terminals 96 and 92, respectively, connected to wire 72. As schematically shown, potentiometers 82 and 84 have wipers 98 and 100, respectively, connected to wires 102 and 104 respectively. Wires 102 and 104 are connected to first and second terminals 106 and 108, respectively of gamma winding 32. As will be apparent, rotation of shaft 86 can move wipers 98 and 100 adjacent terminals 90 and 92, and adjacent terminals 94 and 96, and to all points in-between, thereby providing an excitation voltage to gamma winding 32 which may be of a first polarity and equal in magnitude to the voltage of battery 50, or of a second opposite polarity equal in magnitude to the voltage of battery 50, or any voltage in-between, so that control or gamma pole 26 may act as a north magnetic pole of continuously variable strength, and as a south magnetic pole of continuously variable strength. Of course, a separate source of power for gamma winding 32 may also be used, if desired.

Although the magnetic paths within a dynamoelectric machine according to the invention are interlinked and somewhat interdependent, it may be considered for purposes of FIG. 2 that changing the excitation voltage applied to gamma winding 32 produces a flux in pole 26 which influences the voltage generated in windings of armature 38 lying between A brush 44 and C brush 48. As shown, A brush 44 and C brush 48 are connected to first and second terminals 110 and 112, respectively, of a direct current motor 114. As is known, a motor such as motor 114 may also act as a generator, when power is applied to rotating shaft 116, rather than being removed from it. As shown C brush 48 is connected directly to terminal 112, while the connection of A brush 44 to terminal 110 is through stabilization winding 36, as described above.

Figure 3:
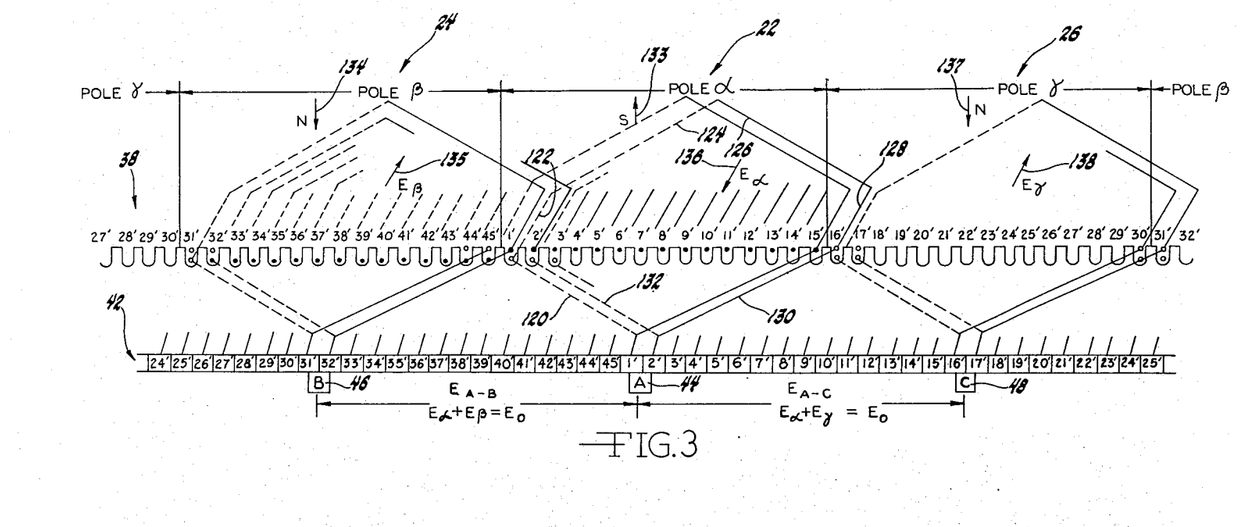
FIGS. 3, 4, and 5 are diagrammatic views showing the function of the armature wiring at different stages of its operation.
Figure 4:
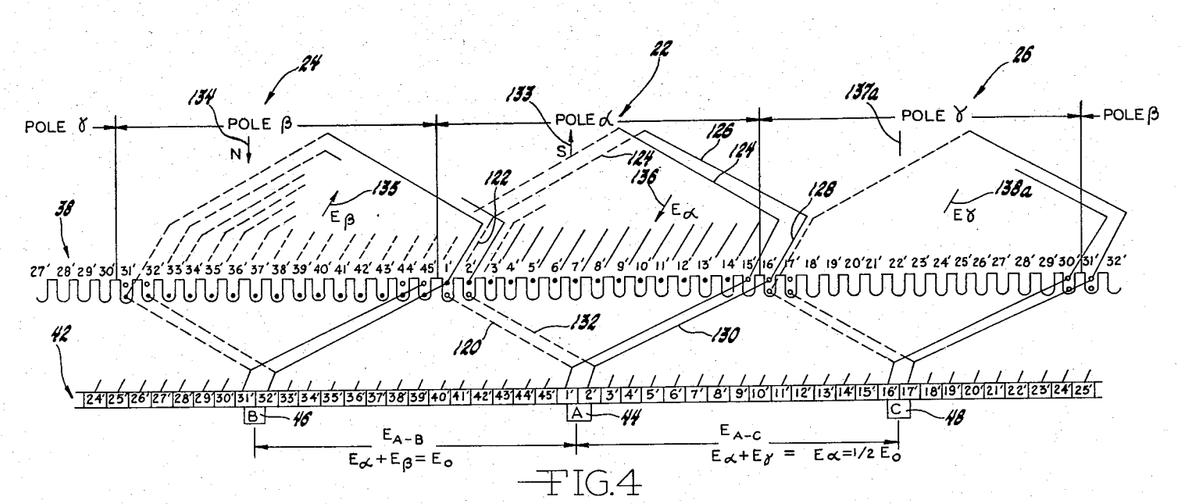
Figure 5:
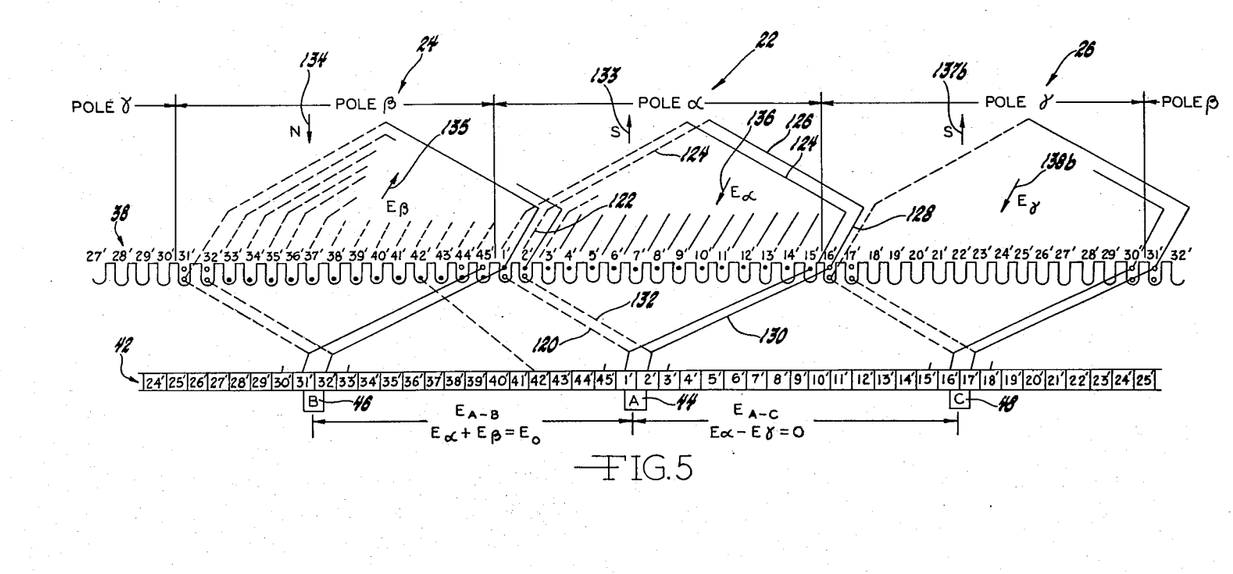

FIGS. 3, 4 and 5 illustrate the interaction between the armature winding and the magnetic fields of a dynamoelectric machine according to the invention. The armature and field structure is presented in a linear manner, in a schematic form developed into a straight line. The armature illustrated in FIGS. 3, 4, and 5 has forty-five winding slots, although any number of slots which are divisible by three is usable in accordance with the invention. The armature winding is shown as a two-layer winding, each slot containing an upper or outer conductor and a lower or inner conductor. Of course, other winding arrangements may be used, such as a side-by-side arrangement. Although numerous conductors are omitted for clarity from FIGS. 3, 4, and 5, one skilled in the art may easily fill in the remainder of the illustrated lap winding, and modify the disclosed three-pole winding into appropriate form for a dynamoelectric machine according to the invention having a number of poles which are an integral multiple of three, with the integral multiplier being greater than one.

The pitch of the armature winding is 120°, the armature being wound as a lap winding. As shown in FIGS. 3, 4, and 5, for example, a conductor section 120 is connected to commutator segment 1', and to conductor section 122, described as a separate section for purposes of illustration only, being preferably a section of a continuous loop, and runs along the bottom of armature slot 1 to the armature end distal to the commutator, through knee section 124 and 126 to section 128, which runs along the upper layer of slot 16 and is connected to section 130, in turn connected to commutator segment 2'. Commutator segment 2' is connected to a conductor section 132, which, as is conventional for a lap winding, proceeds through the bottom, inner or lower layer of armature slot 2' to the upper layer of slot 17', and returns to commutator segment 3'. This process is repeated until both lower and upper, first and second, or inner and outer slots 1' to 45' are filled. Brushes 44, 46, and 48 are symmetrically disposed at intervals of 120 mechanical and electrical degrees about commutator surface 42.

It should be noted that, in FIGS. 3, 4, and 5, conductor segments which are shown as lying in the lower or inner level are illustrated as broken lines, while conductor segments that lie in the upper or outer portion of an armature slot are illustrated in solid lines.

FIGS. 3, 4, and 5 differ in that the flux supplied by gamma or control pole 26 varies from a full-strength north polarity in FIG. 3, through zero in FIG. 4, to a full-strength south polarity in FIG. 5.

FIGS. 3, 4, and 5 show that the conductors of the illustrated lap winding in the upper or outer layer and the conductors in the inner or lower layer are exposed to different fields, and therefore have different voltages induced in them as armature 38 rotates. The voltages induced in the upper and lower layers are in series, but, since the conductors in the lower layer are return conductors, the voltage induced in these conductors subtracts algebraically from the voltage induced in the conductors of the upper layer.

Brushes A, B and C identified as brushes 44, 46, and 48, divide the armature winding into three branches. In FIG. 3, in the branch circuit between A brush 44 and B brush 46, conductors in slots 1' to 15' lie in the upper or outer layer, under alpha pole 22, and conductors in slots 31' to 45' lie in the lower or inner layer, under beta pole 24. Poles 22 and 24, in the absence of stablization excitation, are excited with a constant voltage, and consequently the voltage between A brush 44 and B brush 46 remains theoretically constant during operation. As shown, conductors in slots 1' to 15' are influenced by flux from alpha pole 22 having a south polarity, as indicated by arrow 133, and conductors in slots 31' to 45' are influenced by a flux having a constant north polarity, as indicated by arrow 134. The algebraic sum of these opposing voltages, the voltage generated by conductors under alpha pole 22 ($E_\alpha$) and the opposing voltage generated by conductors under pole beta ($E_{62}$) equals the voltage applied such as by battery 50 ($E_o$). In short, externally, a dynamoelectric machine according to the invention appears to act as a motor between A brush 44 and B brush 46.

An arrow 135 illustrates the polarity of the voltage induced by the flux of beta pole 24 in conductors in slots 31' to 45' ($E_\beta$) and arrow 136 identifies the opposing polarity of the voltage induced in conductors in slots 1' to 15' by the flux from alpha pole 22 ($E_\alpha$).

An output voltage appears between A brush 44 and C brush 48. The magnitude of the output voltage is related to the excitation applied to gamma pole 26. In FIG. 3, gamma pole 26 is excited with current sufficient to produce a flux identical in magnitude to that of alpha pole 22 and beta pole 24, and having a north polarity, as indicated by arrow 137. The voltage induced in conductors lying in slots 16' to 31', lying under gamma pole 26, $E_\gamma$, is indicated by arrow 138. The output voltage appearing between A brush 44 and C brush 48 is the algebraic summation of the voltage induced by conductors in slots 1' to 15' under alpha pole 22 ($E_\alpha$) and the voltage induced in conductors in slots 16' through 31' under gamma pole 26 ($E_\gamma$). In the absence of mechanical load or power input to rotating shaft 40, as shown, induced voltage $E_\alpha$ and induced voltage $E_\gamma$ are in series, the output voltage between A brush 44 and C brush 48 is equal to the input voltage. $E_o$. Thus, a dynamoelectric machine according to the invention provides a maximum output voltage substantially identical to the input voltage when gamma pole 26 is excited to a full-strength north polarity.

In FIG. 4, the excitation applied to gamma pole 26 has been adjusted to produce no net flux. It is believed that the excitation may need to be adjusted slightly towards south excitation to overcome the effect of residual magnetism of the magnetic material of gamma pole 26. Thus, while the voltage between A brush 44 and B brush 46 remains constant and equal to the applied voltage $E_o$ such as supplied by battery 50 of FIG. 1, the voltage appearing between A brush 44 and C brush 48 has changed. Since no flux is produced by excitation of gamma pole 26, as indicated by the lack of a polarity-indicating arrow head on line 137a, no voltage is produced by conductors in slots 17' to 30', as shown by the lack of an arrow head on line 138a, so that the algebraic summation of the voltages appearing at A brush 44, induced primarily by alpha pole 22 and the voltage appearing at brush C is equal to one-half of input voltage $E_o$.

In FIG. 5, the excitation to gamma pole 26 is adjusted to produce a flux having a strength or intensity equal to that of alpha pole 22 and beta pole 24 and having a south polarity, as indicated by arrow 137b, producing a voltage in the direction shown by arrow 138b. Thus, as shown, the algebraic summation of the voltage appearing at A brush 44, ($E_A$) and the voltage appearing at C brush 48 ($E_C$) shows that these equal and opposing voltages cancel, yielding an output voltage of zero, since the voltage induced in the upper layer conductors in slots 16' through 30' is cancelled by the voltage inducted in the lower layer conductors in slots 1' to 15'.

It will be apparent from FIGS. 3, 4, and 5 that, in a similar manner, the voltage appearing between A brush 44 and C brush 48 may be made greater than the input voltage or less than zero, by increasing the strength of excitation of gamma pole 26 with an appropriate polarity. It will also be apparent that the voltage appearing between A brush 44 and B brush 46 may be increased while the voltage between A brush 44 and C brush 48 is held constant, such as would be appropriate for regenerative braking, by increasing the excitation applied to beta pole 24.

Figure 6:
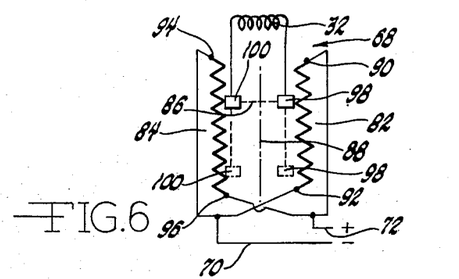
FIG. 6 shows the operation of a pair of linear potentiometers coupled to provide reversing control field excitation.

FIG. 6 shows the principal of a double potentiometer assembly 68 for reversing field excitation of gamma pole 26. Two potentiometers 82 and 84 are connected in opposition to each other, and to a common power supply, such as power supply 50, connected to a positive wire 72 and negative wire 70. When wipers 98 and 100 are in the upper position shown in solid lines in FIG. 6, wiper 98 is connected to positive voltage from wire 72, while wiper 100 is connected to negative wire 70. When brushes 98 and 100 are in a lower position, such as shown in broken lines in FIG. 6, wiper 98 is connected to a negative voltage, while wiper 100 is connected to a positive voltage. In an intermediate position, wipers 98 and 100 are both connected to the same voltage, so that winding 32 receives no excitation.

Figure 7:
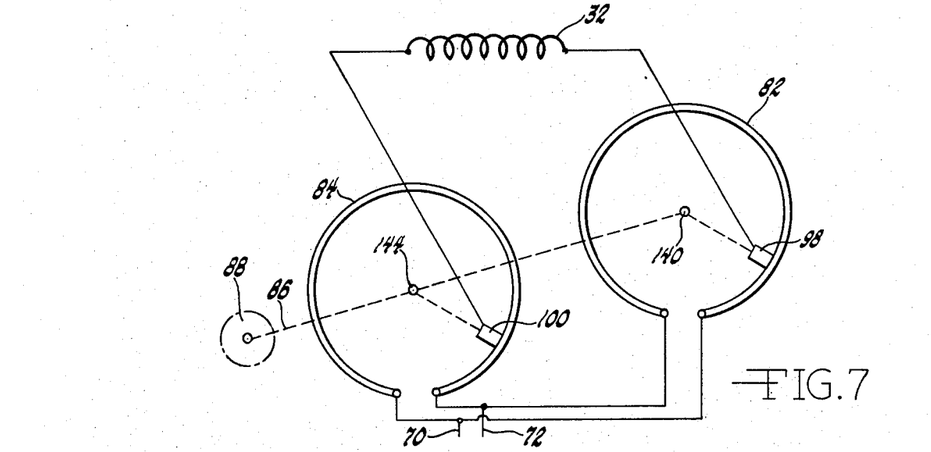
FIG. 7 shows a preferred arrangement of two potentiometers on a common shaft, operating like the two linear potentiometers shown in FIG. 6.

FIG. 7 shows the preferred arrangement for potentiometer assembly 68, potentiometers 82 and 84 being rotary potentiometers mounted for rotation on a common shaft 86. The two potentiometers are connected against each other to a power supply such as wires 70 and 72 connected to terminals 52 and 60 of power supply or battery 50. When an operating mechanism 88, here shown as a knob, is turned, the two wipers 98 and 100 move about their respective centers 140, 144. The voltage between wipers 98 and 100, applied to gamma winding 32, and the resulting excitation, may be reversed in polarity and continuously varied in magnitude in the manner shown in FIG. 6.

Referring again to FIG. 1, during operation of motor 114, it is possible, such as during braking of an electric vehicle driven by motor 114, that the speed of motor 114 may become higher than that demanded by the voltage impressed upon terminals 110 and 112, the counter EMF from motor 114 exceeding the impressed voltage, so that the current through the motor reverses. As a result, power is returned to the dynamoelectric machine according to the invention. However, the voltage appearing between A brush 44 and B brush 46 has not changed. Theoretically, this voltage will be either substantially equal to the voltage of battery 50, or slightly less than the voltage of battery 50, due to resistance losses in wiring between the subject dynamoelectric machine and battery 50. To return energy efficiently to battery 50, a voltage higher than its output voltage should be applied to it. Therefore, the extra power delivered to the subject dynamoelectric machine acts to increase the rotational speed of armature 38, to dissipate the energy in frictional and windage losses. This increased speed may be objectionable, if the subject machine is also connected to a mechanical load or mechanical power source, such as device 145 shown coupled to shaft 40 in FIG. 2.

To keep the speed of the subject machine constant, and increase the voltage between A brush 44 and B brush 46 without causing higher rotational speed of armature 38, it is believed that the excitation of beta pole 24 may be increased. This does not affect the voltage between C brush 48 and A brush 44, because this branch has no conductors under beta pole 24. This extra excitation should be supplied only when the current from the load motor 114 is reversed.

Figure 8:
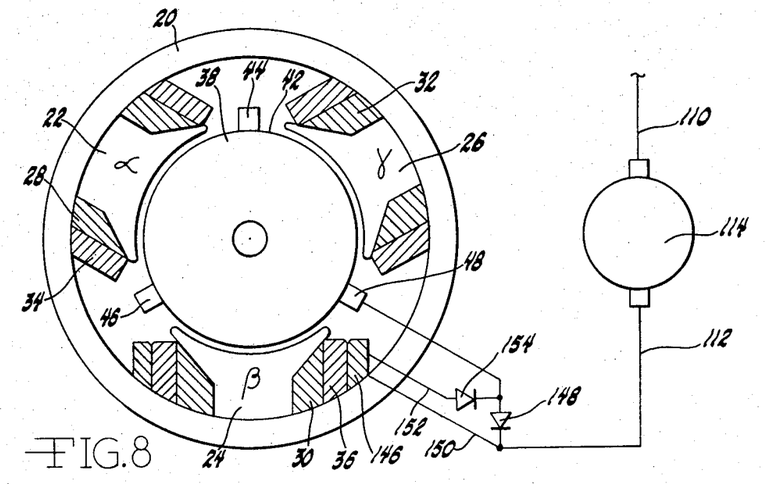
FIG. 8 shows a first excitation circuit for a pole which provides increased excitation current only when the current through a load motor is reversed.

FIG. 8 shows a suitable circuit. In FIG. 8, a booster coil 146 is applied over winding 30 and stabilization winding 36. Therefore, when current flows from C brush 48 to terminal 112 of motor 114, current will flow through diode 148, bypassing booster coil 146. However, if the current is reversed in direction, current will flow from terminal 112 into C brush 48. In this mode, current is blocked from flowing directly to C brush 48 by diode 148, and rather flows into first terminal 150 of booster winding 146, out of second terminal 152 of booster coil 146, through diode 154, to C brush 48, thus increasing the excitation of beta pole 24. However, as will be apparent, this may result in an increase in the size of the subject machine to allow for this additional coil on beta pole 24.

The preferred circuit for increasing the voltage between A brush 44 and B brush 46 is shown in FIG. 9. In this circuit, the winding 154 wound on beta pole 24 is wound with the same number of turns as winding 30, shown in FIG. 1, but with a larger conductor size, providing a lower resistance, and a greater number of ampere-turns for a given excitation voltage. A resistor 156 is placed in series with winding 154 to limit the excitation of beta pole 24 to that of alpha pole 22, in normal operation. Resistor 156 is connected in series with winding 154, between wire 70 and first terminal 158 of winding 154. Second terminal 160 of winding 154 is connected to wire 72. First and second terminals 162 and 164 of resistor 156 are joined to switch means 166 by wires 168 and 170. Wires 168 and 170 are connected to first and second terminals 172 and 174 of switch means 166. Switch means 166 may be characterized as a relay which is sensitive to the direction of current flow, and may be made in numerous ways, such as by the use of steering diodes as shown in FIG. 8 to control a low-impedance relay coil, or by the use of a Hall-effect sensor and steering diodes controlling a high-impedance relay, or by the use of any other means which detects the current in wire 176 connected between C brush 48 and terminal 112 of motor 114.

In FIG. 9, the stabilization winding arrangement is chosen from column 2 of the table above, with stabilization windings added to alpha pole 28 and gamma pole 32. A wire 178 connected to terminal 52 of power supply shown as battery 50 is connected to a first terminal 180 of stabilization winding 182, and also to a first terminal 184 of stabilization winding 186. Second terminal 188 of stabilization winding 182 is connected to A brush 44, and second terminal 190 of stabilization winding 186 is connected to terminal 110 of motor 114. Potentiometers 192 and 194 are provided to make initial adjustments in stabilization current to provide optimum stabilization. Potentiometer 192 is connected between first terminal 184 and second terminal 190 of winding 186, and potentiometer 194 is connected between first terminal 180 and second terminal 188 of winding 182.

Figure 10:
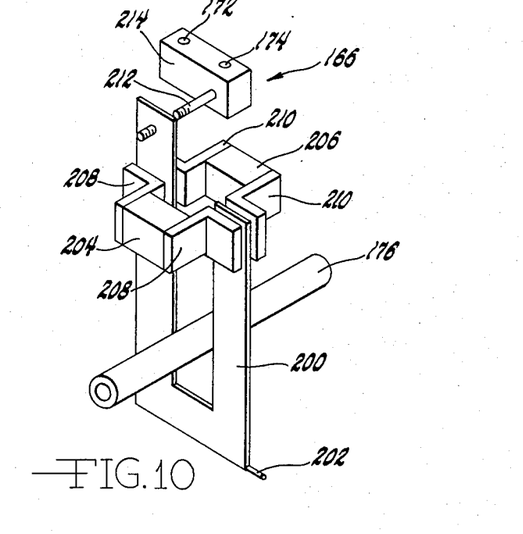
FIG. 10 illustrates a polarized relay for providing increased excitation current to a pole when the current through the load motor is reversed.

FIG. 10 shows a preferred embodiment of switch means 166, in the form of a polarized relay. Wire 176 passes through a yoke 200, which is pivotably supported on rod 202, which in turn may be supported in any convenient manner. Yoke 200 is suspended between a pair of permanent magnets 204 and 206, which are provided with pole shoes 208 and 210, respectively.

Yoke 200 is made of a magnetic material, which may be magnetized by current flow through wire 176, the polarity of the resultant magnetization depending on the direction of the current flow. For forward current flow and normal operation, yoke 200 is magnetized so as to be attracted to pole shoes 208 of magnet 204. When current is reversed, such as during regenerative breaking of an electric motor, yoke 200 is magnetized so as to be attracted to pole shoe 210 of magnet 206, thus actuating plunger 212 of a conventional switch 214, having terminals 172 and 174, as shown in FIG. 9. Support members for magnets 204 and 206 have been omitted for clarity. Preferably, they are adhesively attached to a bracket of non-magnetic or paramagnetic material, such as plastic or aluminum, or clamped to such a bracket using a nonmagnetic or paramagnetic clamping material.

FIG. 11 illustrates a six-pole embodiment of a dynamoelectric machine according to the invention. All dynamoelectric machines according to the invention having a number of poles which are a multiple of three with a nonunitary multiplier have poles and brushes connected in parallel. Therefore, the embodiment of FIG. 11 is quite similar to the embodiment of FIG. 2, but with the addition of paralleled poles and brushes, and the use of stabilization selected from column 1 of the table above. When feasible, the reference numerals used in FIG. 11 will be the same as or similar to corresponding reference numerals used in FIGS. 2 and 9 for corresponding items. It should also be noted that the embodiment of FIG. 11 may also incorporate beta poles 154, as shown in FIG. 9 with series resistors 156, or an additional coil and steering diodes as shown in FIG. 8. Such modifications have been omitted from FIG. 11 for clarity.

As illustrated, a six pole dynamoelectric machine according to the invention has two alpha poles 28a and 28b, two beta poles 30a and 30b and two gamma poles 32a and 32b, equally spaced around armature 38a, in a serially repeating manner in the order of the Greek characters alpha, beta and gamma. Interposed between the poles are a pair of A brushes 44a and 44b, a pair of B brushes 46a and 46b, and a pair of C brushes 48a and 48b. As in FIGS. 2 and 9, an A brush is disposed between an alpha pole and a gamma pole, a B brush is disposed between an alpha pole and a beta pole and a C brush is disposed between each adjacent beta pole and gamma pole. The A brushes 44a and 44b are interconnected by a jumper 220. The B brushes 46a and 46b are interconnected by a jumper 222, and the C brushes 48a and 48b are interconnected by a jumper 224. Armature 38a is an appropriate modification of armature 38, shown in FIGS. 3, 4, and 5, with the ends of adjacent winding loops connected to adjacent commutator bars spaced 60 mechanical degrees from the adjacent commutators bars where the beginnings of these adjacent loops are connected, rather than having the start and finish of a given loop connected to adjacent commutator bars as shown in FIGS. 3, 4 and 5.

FIG. 11 also differs from FIGS. 2 and 9 in the arrangement of stabilizer coils, gamma poles 32a and 32b, and beta poles 30a and 30b being provided with stabilization windings. The beta poles are provided with a stabilization windings 226a and 226b, placed in series with the current from the pair of C brushes, and the gamma poles are provided with stabilization windings 228a and 228b, placed in series with the current carried by the pair of B brushes. As shown, stabilization windings 226a has a first terminal 230 connected to terminal 112 of motor 114, and a second terminal 232 connected to a first terminal 234 of stabilization winding 226b. Stabilization winding 226b has a second terminal 236 connected to C brush 48b, which in turn is connected in parallel with C brush 48a by jumper 224.

Stabilization winding 228a has a first terminal 238 connected to wire 70, which in turn is connected to terminal 60 of power supply 50. A second terminal 240 of stabilization winding 228a is connected to a first terminal 242 of stabilization winding 228b. The second terminal 246 of stabilization 228b is connected to B brush 46a, which in turn is connected in parallel with B brush 46b by jumper 222.

As will be apparent to one skilled in the art, numerous modifications and variations of the precise embodiments of the invention disclosed may be made without departing from the spirit and scope of the invention.

I claim:

1. Electrical control equipment for controlling the power supplied to a load, said equipment comprising in combination a field structure and an armature concentrically related and mounted for relative rotation one with respect to the other, said field structure including one or more sets of poles with each set consisting of a first, a second and a third pole, all of said poles being equidistantly spaced circumferentially around said field structure, a commutator connected to said armature and engaged by sets of brushes, with each set consisting of a first, a second and a third brush, corresponding respectively to said first, second and third pole, there being a set of brushes for each set of poles, said brushes being equidistantly spaced circumferentially with respect to said commutator, said first and second brushes being provided with means for establishing connection with respective terminals of a source of electrical power, said first and third brushes being provided with means for establishing connection to respective terminals of said load for furnishing electrical power thereto, there being at least one excitation winding on each of said poles, means connected to said excitation windings on said first and second poles for coupling said last mentioned windings to a source of energization for establishing first and second poles of fixed and opposite magnetic polarity, and said windings on said third poles are provided with means for changing the field current in said windings from excitation of one polarity to excitation of the opposite polarity and through all excitation levels inbetween, to change the voltage delivered to said load.

2. Electrical control equipment according to claim 1, characterized in that said poles in each set of poles are spaced 120 electrical degrees apart.

3. Electrical control equipment according to claim 1, characterized in that said second poles are provided with additional windings, and means are provided coupled to said additional windings for supplying a current thereto in a direction to augment the magnetic field established by said second poles as a function of the current flowing through said third brushes.

4. Electrical control equipment according to claim 3, characterized in that said third poles are provided with additional windings, and means are provided coupled to said additional windings on said third poles for supplying a current thereto in a direction to diminish the magnetic field established by said third poles as a function of the current flowing through said second brushes.

5. Electrical control equipment according to claim 1, characterized in that said first poles are provided with additional windings, means are provided coupled to said additional windings on said first poles for supporting a current thereto in a direction to diminish the magnetic field established by said first poles as a function of the current flowing through said third brushes, said third poles are provided with additional windings, and means are provided coupled to said additional windings on said third poles for supplying a current thereto in a direction to augment the magnetic field established by said third poles as a function of the current flowing through said first brushes.

6. Electrical control equipment according to claim 1, characterized in that said first poles are provided with additional windings, means are provided coupled to said additional windings for supplying a current thereto in a direction to augment the magnetic field established by said first poles as a function of the current flowing through said second brushes, said second poles are provided with additional windings, and means are provided coupled to said additional windings on said second poles for supplying a current thereto in a direction to diminish the magnetic field established by said second poles as a function of the current flowing through said first brushes.

7. Electrical control equipment according to claim 1, characterized in that said equipment is provided with mechanical output means and is constructed and arranged to accept input electrical power and to convert said input power into mechanical output power furnished to said mechanical output means, and into adjustable electrical power furnished to said load.

8. Electrical control equipment according to claim 1, characterized in that said equipment is provided with mechanical input means and is constructed and arranged to convert mechanical input received from said mechanical input means into controlled electrical power supplied to said load with excess electrical power being fed back to said source of electrical power.

9. Electrical control equipment according to claim 1, characterized in that said second poles are provided with an additional winding, and means are provided for electrically exciting said additional windings on said second poles when said load feeds back electrical power to said equipment to increase the voltage across said first and second brushes to force power back into said source of electrical power for regenerative braking of said load when said load is an electromechanical device.

10. Electrical control equipment according to claim 9, characterized in that said means for electrically exciting said additional windings on said second poles includes for such additional windings first unidirectional conducting means connected to shunt said additional windings when said equipment delivers power to said load, and second unidirectional conducting means connected in series with said additional windings to permit current to flow through said windings when said load delivers power to said equipment.

11. Electrical control equipment according to claim 1, characterized in that said excitation windings on said second poles are wound with the same number of turns as said excitation windings on said first poles but with conductors of lesser resistance than the conductors of said windings of said first poles, a series resistor is disposed in series with each of said excitation windings of said second poles, and means are provided for shunting each of said series resistors when said load feeds back electrical power to said equipment to increase the voltage across said first and second brushes to force power back into said source of electrical power for regenerative braking of said load when said load is an electromechanical device.

12. Electrical control equipment according to claim 11, characterized in that said means for shunting said series resistors comprises a polarized relay actuated by electrical current flowing to and from said load, said relay being constructed and arranged to close a switch for shunting a respective resistor when current flows from said load to said equipment.

13. Electrical control equipment according to claim 12, characterized in that said polarized relay includes a yoke having two legs surrounding a conductor carrying said current to and from said load, and a relay body, said relay body including a pair of permanent magnets, each of said permanent magnets including pole shoe means, said pole shoe means defining confronting spaced apart field poles facing opposite surfaces of said two legs of said yoke, said relay body including a switch connected to at least one of said resistors and operable by said yoke, said yoke being magnetized with a first polarity when current flows through said conductor to said load and being drawn towards a first one of said magnets, and said yoke being magnetized with a second polarity opposite to said first polarity when current flows through said conductor from said load and being drawn towards the other of said magnets to actuate said switch.

* * * * *

UNITED STATES PATENT AND TRADEMARK OFFICE
CERTIFICATE OF CORRECTION

PATENT NO. : 4,383,213
DATED : May 10, 1983
INVENTOR(S) : JOSEPH M. TYRNER

It is certified that error appears in the above-identified patent and that said Letters Patent are hereby corrected as shown below:

Column 7, line 22, "$(E_{62})$" should read --$(E_\beta)$--.

Column 12, lines 16 and 17, "supporting" should read --supplying--.

Signed and Sealed this

Fifth Day of July 1983

{SEAL}

Attest:

GERALD J. MOSSINGHOFF

Attesting Officer    Commissioner of Patents and Trademarks